United States Patent [19]

Westbeck

[11] 4,267,736
[45] May 19, 1981

[54] DEVICE FOR TILTING THE BODY OF A HIGH-SPEED VEHICLE RELATIVE TO AN UNDERFRAME THEREOF

[75] Inventor: Gunnar A. E. G. Westbeck, Solna, Sweden

[73] Assignee: Westbeck Navitele AB, Stockholm, Sweden

[21] Appl. No.: 766,849

[22] Filed: Feb. 9, 1977

[30] Foreign Application Priority Data

Feb. 9, 1976 [SE] Sweden .................. 7601345

[51] Int. Cl.³ .................. G01C 19/42; B62D 37/00
[52] U.S. Cl. .................. 74/5.22; 105/164; 280/6.1
[58] Field of Search ............ 74/5.22, 5 R; 105/164; 280/112 A, 6.1, 707

[56] References Cited

U.S. PATENT DOCUMENTS

| | | | |
|---|---|---|---|
| 3,540,293 | 11/1970 | Cochin | 74/5 R |
| 3,683,818 | 8/1972 | Meir et al. | 105/164 |
| 3,789,769 | 2/1974 | Strohmer et al. | 105/164 |
| 3,795,203 | 3/1974 | Sundby | 105/164 X |
| 3,844,225 | 10/1974 | DiMajo | 105/164 |

Primary Examiner—Rodney H. Bonck
Attorney, Agent, or Firm—McAulay, Fields, Fisher, Goldstein & Nissen

[57] ABSTRACT

A tilting arrangement for a vehicle with the aid of which a body of the vehicle is adjustable in a roll direction relative to an underframe of the vehicle to compensate for centrifugal force exerted in curves on subjects resting on the body is controlled by a control signal which is produced with the aid of a device comprising a speedometer and a gyro arrangement for producing signals which are representative of the travelling velocity and the yaw angular velocity of the vehicle as well as the roll angular velocity and the roll angle of either one of said parts of the vehicle. The signals are combined to produce a control signal the magnitude of which is representative of the expression $|m.V.\dot{\theta}_{gir}| - |k.g.\theta_{roll}|$, and has a sign, plus or minus, determined by the sign of the signal representative of $\theta_{roll}$, in which expression V is the travelling velocity of the vehicle, $\dot{\theta}_{gir}$ is the yaw angular velocity of the vehicle, $\theta_{roll}$ is the roll angle of either of said parts of the vehicle, and m and k are each coefficients normally equalling 1 for full compensation of the centrifugal force exerted on subjects resting on the vehicle body.

10 Claims, 4 Drawing Figures

DEVICE FOR TILTING THE BODY OF A HIGH-SPEED VEHICLE RELATIVE TO AN UNDERFRAME THEREOF

Modern high-speed trains are presently being developed in which the coach-bodies of the vehicles are tilted relative to the coach underframe in such a manner that the influence of the centrifugal acceleration is compensated, totally or partly, by the gravity component of the lateral force. The published Swedish patent application Ser. No. 12995/1971 published under No. 392,247, now Swedish Pat. No. 7112 995-1 entitled, "A device for tilting a vehicle moving on steady substratum", describes a device for this purpose. Devices subject of the U.S. Pat. No. 3,789,769 which corresponds to the Swedish Pat. No. 356,474 to Knorr-Bremse GmbH, München, DT, and the U.S. Pat. No. 1,313,192 which corresponds to the Swedish Pat. No. 366,513 to Honeywell GmbH, Frankfurt/Main, DT, are intended for similar purposes.

According to said patent specification 356,474 which corresponds to U.S. Pat. No. 3,789,769 a pendulum is used for measuring the lateral acceleration arising in the vehicle when moving. In a curve i.e., when the vehicle encounters a curve, the arm of the pendulum will adopt a direction parallel to the resultant of the gravity acceleration and the centrifugal acceleration. In order to detect an entrance of the vehicle into a curve with variable radius of curvature, i.e. a so called transition curve, a gyro device is used which delivers signals representative of the yaw angular velocity and the yaw angular acceleration of the vehicle, of which signals the angular acceleration is used to start the tilting device. When passing around the curve with constant radius of curvature no angular acceleration is, as a rule, present, and the signal representing the angular velocity is used to keep the tilting device in position. When the vehicle then enters a transition curve before a length of straight track, a signal representing angular acceleration of the vehicle is again obtained, although in the opposite direction as compared with the signal obtained in the transition curve ahead of the constant radius curve. This causes the tilting device to begin to straighten up the vehicle, the pendulum limiting the tilting velocity to a correct value while taking the properties of the transition curve into account. The yaw angular velocity as well as the yaw angular acceleration change sign when changing direction of passage of the vehicle through the curve. This is also valid for the same direction of passage if the vehicle is turned around. With this device, however, a complicated logic equipment is a requirement for correctly deciding the direction of tilting.

A report "Il convoglio ad asetto variable delle F. S. Primi risultati sperimentali" by Dr. Ing. O. Santanera, Dr. Ing. R. Frullini and Dr. Ing. C. Bianchi, XX Convegno Internazionale delle Communicazione Genova, Oct. 8–13, 1972, and U.S. Pat. No. 3,844,225 which is based thereon describes a train having a tilting device consisting of hydraulic cylinders controlled by a gyro equipment for measuring the roll angular velocity of the fore bogie of the train. The roll angular velocity has the same character as the yaw angular acceleration in a transition curve, implying that no roll angular velocity is present in curves with constant radius of curvature. In the train described in this report the tilting device is controlled by a synthetic (or derived) signal derived from a ramp signal combined with a delayed signal obtained from a conventional accelerometer, the resulting signal simulating conditions of a transition curve. During the larger part of the constant-radius portion of the curve, the tilting device is controlled by the accelerometer. The use of the accelerometer signal in the control system necessitates a substantial filtering of the signal, resulting in a considerable delay of the signal, the object of the synthetic signal being to compensate for such delay. The roll angular velocity is used to start and stop the ramp signals which are necessary for this compensation.

The report "La compensation d'insuffisance de devers pour ameliorer le confort et accroitre la vitesse des trains de voyageurs", 14ème Congrès Vehicules Ferroviaire Modernes, Graz 16–18 Oct. 1972, describes experimental trains existing in France and problems in connection with tilting devices for high-speed trains. Pages 8–10 and 14 of this report deals with the unfeasibility to use filters causing substantially delay without compensating for such delay, and on pages 17–20 the report emphasizes that in tilting devices of this kind an additional damping in roll, compared with normal railway coaches, must be present in order to achieve stability and speed of the device.

The Swedish Patent specification No. 366,513 mentioned above describes an arrangement consisting of a sensing means followed by a low-pass filter, the cut-off frequency of which is chosen such that parasitic signals from switches and irregularities in the track are filtered out, leading to the non-desirable delay dealt with above. To compensate for this deficiency, a tilting device is, further, controlled by a gyro signal operative in parallel with the control signal of the delaying filter for starting the tilting operation irrespective of a control signal from the delaying filter. In order to speed up the operation of the tilting device at the access of a curve, an equipment is present which compares the output signal of the acceleration sensing means in front of the filter with the control signal applied to the tilting device, this equipment generating a control signal for straightening up the tilted part of the vehicle when said comparison shows that such straightening up shall be executed.

All the arrangements described above, but for the ones used on French experimental trains, comprise combinations of acceleration sensors, such as pendulums or accelerometers and gryo equipments. In all cases the object of gyro equipments is to detect entrance in and exit out of curves, the gyro equipments delivering output signals without delay and of such quality that an additional delaying filtering will be superfluous.

Applicant's published Swedish patent application No. 12995/1971 describes a device in which the yaw angular velocity and the travelling velocity of a vehicle are combined to obtain a control signal to control a tilting device of the vehicle. Thus, according to said Swedish patent application a signal obtained from a gyro arrangement and representing the yaw angular velocity of a vehicle is combined with a signal representing the travelling velocity of the vehicle to obtain an acceleration signal, therewith obviating the requirement of additional acceleration sensing means.

The present invention constitutes a further development of the invention described in the specification of the above mentioned Swedish Patent application No. 12995/71, by which certain insufficiency of a device according to said application and disadvantages of other prior art devices described above are met with, in a device for controlling a tilting arrangement by aid of which a body of a vehicle is adjustable in a roll direction relative to an underframe of the vehicle in dependence of a control signal applied to the tilting arrangement and comprising a speedometer and a gyro arrangement for producing signals which when the vehicle passes a curve obtain values representative of the travelling velocity and the yaw angular velocity of the vehicle as well as the roll angular velocity and the roll angle of either one of said parts of the vehicle relative to a desired position of said one part of the vehicle on a straight and horizontal track, and means for producing, in dependence of said values, a signal having a value representative of the expression $m.V.\dot{\theta}_{gir}$ in which m is a coefficient normally having the value 1, V is the travelling velocity of the vehicle, and $\dot{\theta}_{gir}$ is the yaw angular velocity, and a signal having a value representative of the expression $k.g.\theta_{roll}$, in which k is a coefficient normally having the value 1, g is the gravity acceleration, and $\theta_{roll}$ is the roll angle of the body of the vehicle, constituting the sum of the superelevation angle in a curve and the roll angle of the body relative to the underframe, why the device according to the present invention comprising means for producing a signal, the magnitude of which is representative of the difference between the absolute value of the expression $m.V.\dot{\theta}_{gir}$ and the absolute value of the expression $k.g.\theta_{roll}$, that is, representative of the value of the expression $|m.V.\dot{\theta}_{gir}| - |k.g.\theta_{roll}|$, and means for applying said signal as a control signal to the tilting arrangement for rolling the body relative to the frame in a direction determined by the sign, plus or minus, of the signal representative of the roll angle $\theta_{roll}$.

It is, therefore, an object of the present invention to highly simplify the logic equipment for determining the direction in which the body is to be tilted in dependence of the control signal, such logic arrangement being necessary due to the fact that the signal representative of the yaw angular acceleration changes its sign when changing direction of passage of the vehicle through a curve.

Another object of the invention is to provide means to replace means for producing a synthetic signal otherwise used as a combination control signal in a transition curve by substituting a signal obtained from a gyro arrangement for the synthetic signal.

A still further object of the invention is to provide a signal having the property of being able to give optimal damping and speed of the tilting arrangement.

The signal generating means of a device according to the invention are capable not only to produce a proper control signal for controlling the tilting arrangement, but as well to provide a feed back signal from the tilting arrangement. This is made possible by aid of a two-axes gyro arrangement capable of delivering yaw angular velocity as well as roll angular velocity of the tilted part, the body, of the vehicle. A gyro arrangement capable of delivering a signal representative of said two angular velocities belongs as such to prior art as appearing from "FOA 2 Report C2640-E4, November 1973", a report of the Swedish Defence Research Establishment, having the title "The Ball Gyro - Transition Function, Circuit Constants, and Electronics" by Ulf Ekström, describing a two-axes gyro arrangement.

DETAILED DESCRIPTION OF CERTAIN PREFERRED EMBODIMENTS

Figure 1:
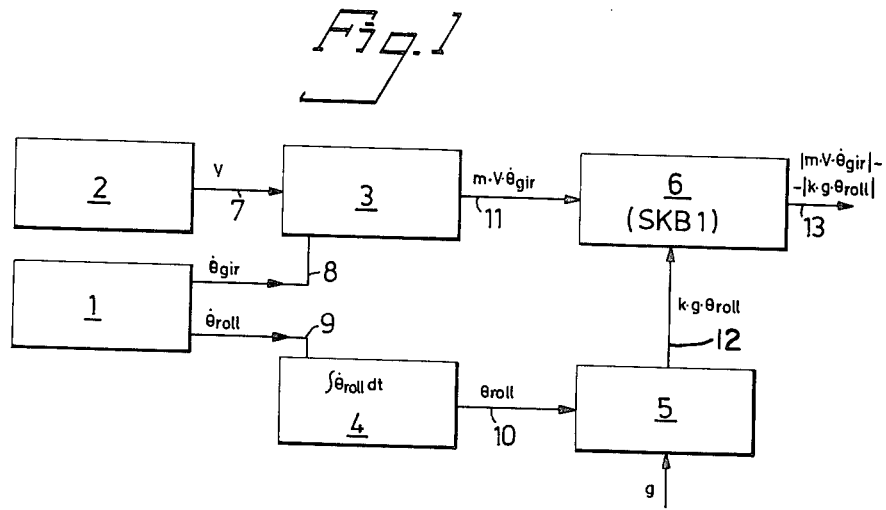
FIG. 1 is a diagrammatic block diagram of a measuring device, forming part of one form of apparatus in accordance with the invention for controlling the tilt angle of a vehicle body, the measuring device serving to produce a tilt angle error signal.

FIG. 1 illustrates the main principle of the invention and shows in form of a block diagram means including a measuring device for producing a control signal for controlling a tilting mechanism acting between an underframe of a vehicle (e.g. a railway coach) and a vehicle body carried by the underframe. The blocks all represent apparatus as such known to the art. 1 is a two axes gyro arrangement producing output signals representative of two orthogonal angular velocity signals, namely, in the present case, yaw angle velocity $\dot{\theta}_{gir}$ and roll angle velocity $\dot{\theta}_{roll}$ of the part of the vehicle on which the gyro arrangement is mounted. 2 is a speedometer or velocity detector delivering an output signal representative of the travelling velocity V of the vehicle. 3 is a multiplier receiving as input signals to be multiplied, the signal representative of the travelling velocity V from speedometer 2 and the angle velocity $\dot{\theta}_{gir}$ from the gyro 1 via connections 7 and 8, respectively. The multiplier by proper choice of scaling of the input signals and multiplications delivers the signal $m.V.\dot{\theta}_{gir}$, this signal being proportional to the centrifugal acceleration and represents a measure of the centrifugal acceleration when m is equal to 1.

The signal representing, with a properly chosen scale, the roll angular velocity $\dot{\theta}_{roll}$ is fed via a connection 9 to an integrator 4 multiplying said signal by time and thus delivering at its output a signal representing the tilting angle $\theta_{roll}$, relative to a reference plane, (e.g. a vertical plane) of that part of the vehicle on which the gyro arrangement is mounted, this angle being related to the starting position in which the integrator setting is zero, provided for when the vehicle is moving on a straight track. Via a connection 10 the integrator output signal is fed to a multiplier 5, said multiplier delivering by proper scaling an output signal $k.g.\theta_{roll}$, in which g is the gravity acceleration and k is a scale coefficient, normally having the value 1, and $\theta_{roll}$ is the roll angle, of the vehicle part (i.e. vehicle body or underframe) on which the gyro arrangement is mounted. The signal $k.g.\theta_{roll}$ represents the lateral component of the gravity acceleration for the roll or tilting angle $\theta_{roll}$. More accurately, this component of the gravity acceleration for a roll or tilting angle $\theta_{roll}$ is $g. \sin \theta_{roll}$, but due to the fact this angle is normally small the sine for this angle can be replaced or sufficiently closely approximated by the angle itself.

6 is a differential arrangement producing an output signal representative of the difference between the signal $m.V.\dot{\theta}_{gir}$, applied to an input via a connection 11 between the output of multiplier 3 and an input of the differential arrangement 6 and the signal $k.g.\theta_{roll}$ applied from multiplier 5 to a second input of the differential arrangement 6. As a matter of principle, it should now be mentioned that with proper choice of scales when producing the input signals to differential arrangement 6, the output signal of this arrangement, utilized as the control signal for the tilting servo arrangement of the vehicle, will have the value 0 when the centrifugal acceleration $V.\dot{\theta}_{gir}$ and the lateral component $g.\theta_{roll}$ of the gravity acceleration are equal. Normally, for a full compensation of the centrifugal acceleration by the lateral component of the gravity acceleration, the coefficients m and k of the respective expressions are equal to 1. Thus, when this is the case, then the output signal of the differential arrangement 6 is representative of the resulting lateral acceleration. From servo-technical points of view it may be feasible to give either m or k or both a value deviating from 1. Such is the case when, from mechanical or other points of view, it is not possible or suitable to tilt the coach-body as much as is required for full compensation of the centrifugal acceleration. If then m is given a value less than 1 while letting k be 1, the output signal obtained from differential arrangement 6 equals zero before a full compensation is obtained. If, instead, k is given a value larger than 1, letting m have the value 1, the same result is obtained. The resulting output roll angle error signal of differential arrangement 6 is then utilized as a control signal for controlling a selected kind of tilting servo mechanism.

The differential arrangement 6 has the property to produce the difference between the input signals when the yaw angular velocity and the roll angular velocity have the same sign and of producing the sum of the input signals when the yaw angular velocity and the roll angular velocity have opposite signs, that is, the differential arrangement 6 always produces a signal representing the value of the expression $|m.V.\dot{\theta}_{gir}| - |k.g.\theta_{roll}|$. This is a requirement due to the fact the yaw angular velocity changes sign when the direction of travelling is changed or reverses. On the other hand, since the sign of the roll angular velocity is independent of the direction of travelling, the tilting in a particular curve always occurs in the direction of the same point of the compass. So, for instance, the differential arrangement 6 may consist of an amplifier having two inverting inputs and one non-inverting input. The signal $m.V.\dot{\theta}_{gir}$ representing the centrifugal acceleration is fed either to the non-inverting input or to an inverting input via a switch, a relay for instance. Such relay may be controlled by a transistor which becomes conducting when an AND-gate gives an output signal, this AND-gate being fed from another AND-gate and a NAND-gate which both give 0 at the outputs at AND- and NAND-function, respectively. Said two gates are fed with signals representing the polarity of the yaw angular velocity and the roll angular velocity, respectively. A prerequisite for the AND-gate connected to the relay to an output is then that the yaw angular velocity and the roll angular velocity have different signs.

An alternative arrangement is to let the differential arrangement 6 consist of an amplifier having a non-inverting input for the centrifugal acceleration signal and an inverting input for the gravity acceleration signal, full wave rectifiers or corresponding means being arranged ahead of said inputs, by which means the signals representative of the roll angular velocity and the signals representative of the yaw angular velocity always obtain the same polarity the output signal of this amplifier is then, via a relay, applied to either a non-inverting input or an inverting input, the relay being controlled by a gate arrangement corresponding to the one described above.

The differential arrangement 6 may also constitute part of a computer program or be represented by another digital arrangement producing the intended control or error signal.

Figure 2:
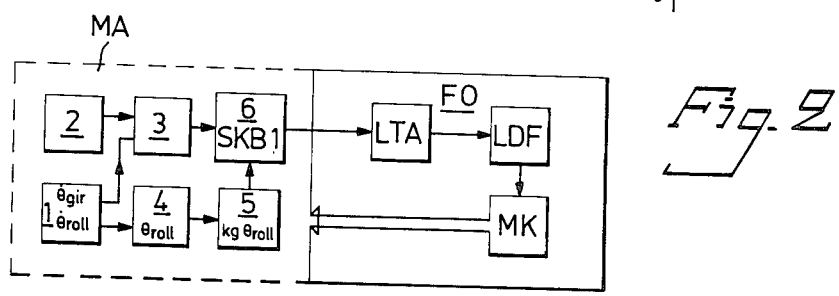
FIG. 2 is a diagrammatic block diagram of the complete tilt angle controlling apparatus illustrating a tilting arrangement in which a gyro unit is mounted in the vehicle body to be tilted.

FIG. 2 shows the complete apparatus for controlling the tilt angle of the vehicle body including a tilting servo arrangement in which the gyro arrangement is mounted on the vehicle body to be tilted in relation to the underframe of the vehicle in form of a measuring device MA as such comprising the components 1 through 11 and 13 described in connection with FIG. 1 and represented by the dashed line block MA of FIG. 2. The differential arrangement SKB1, corresponding to differential arrangement 6 of FIG. 1, delivers via a connection 13 a control signal to the tilting arrangement LTA of the vehicle FO. The tilted part of the vehicle, symbolized by block LDF, is by means of a mechanical coupling MK by strap down mounting of the gyro arrangement connected to the measuring device MA. The measuring device will then register a movement of the tilted part LDF of the vehicle. The tilting arrangement LTA will then adjust itself by readjusting the tilt angle of the vehicle body such that the measuring device MA delivers a reduced or zero signal from the differential arrangement SKB1, the intended action of the roll angle control apparatus then having been obtained, in that all (i.e. k=m) or a desired part (i.e. k≠m) of the centrifugal acceleration $V.\dot{\theta}_{gir}$ has been compensated by the lateral component $g.\theta_{roll}$ of the gravity acceleration.

Of course, the output error signal of differential arrangement 6 having the value $|mV\theta_{gyr}| - |kg\theta_{roll}|$ needs to be applied with the appropriate sign, plus or minus, so that the system is always compensating so as to tend to reduce the value of $|mV\theta_{gyr}| - |kg\theta_{roll}|$. Conveniently, the appropriate sign is determined from the sign of $\theta_{roll}$ as derived from the output of the gyro arrangement.

Figure 3:
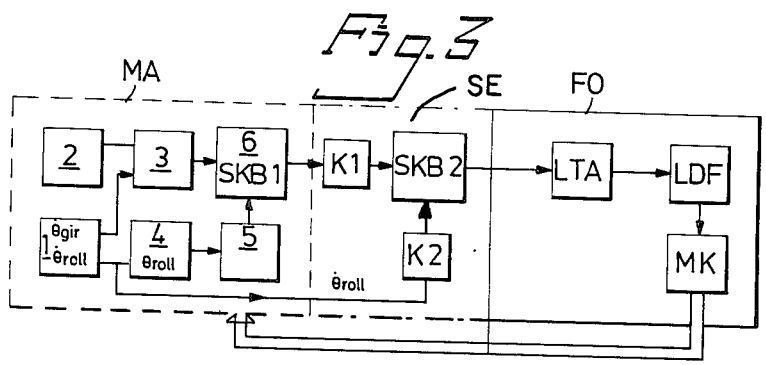
FIG. 3 is a diagrammatic block diagram illustration of a further embodiment of an arrangement according to the invention in which a gyro unit is mounted in the vehicle body to be tilted.

FIG. 3 shows a further development of the servo arrangement shown in FIG. 2. An electronic circuit means SE is introduced between the vehicle FO and the measuring device MA, said electronic circuit means SE comprising an amplifier K1, an amplifier K2, and a second differential arrangement SKB2. In addition to the output signal of SKB1, representing the difference $|m.V.\dot{\theta}_{gir}| - |k.g.\theta_{roll}|$ also the roll angular velocity $\dot{\theta}_{roll}$ is derived from the measuring arrangement MA. This signal is fed to amplifier K2, which in its turn applies the signal to the second differential arrangement SKB2, a second input of which receives, via amplifier K1, an input signal originating from the first differential arrangement SKB1 of the measuring device MA, the output signal from SKB2 constituting the control signal having the appropriate sign controlling the tilting arrangement LTA on account of the strap down mounting of the gyro arrangement in the tilted part LDF of the vehicle a mechanical coupling MK is present between the measuring device MA and the tilted part LDF of the vehicle. Due to the fact that the roll angular velocity $\dot{\theta}_{roll}$ is fed back to the second differential arrangement SKB2 ahead of the tilting arrangement, a servo system of this type obtains a velocity feed forward dependent response, providing for a desired increase of attenuation in the servo-loop. When the amplification in amplifier K2 inserted in the velocity loop is selected large enough, the properties of this loop represents the dynamical properties of the tilted part of the vehicle. It can be shown mathematically that the dynamics of the tilted part of the vehicle is approximately replaced by the inverted value of the amplification in the velocity feed loop. For a closer examination of this mathematical calculation, reference is made to the work Floyd E. Nixon, "Principles of Automatic Controls", New York 1953, Prentice Hall Inc., pages 219–221. Because of the fact that a signal representative of the roll angular velocity $\dot{\theta}_{roll}$ is, as well, derived from the measuring device MA, this signal is as well as such suitable for being used as the feed velocity signal to a servo mechanism having velocity feedback facilities.

Of course, the criterion in which all embodiments the tilt angle controlling apparatus endeavours to satisfy for complete or partial compensation of the centrifugal acceleration by the lateral component of the gravity acceleration is that $|m.V.\dot{\theta}_{gir}| - |kg\theta_{roll\ VB}| = 0$ where $\theta_{roll\ VB}$ is the roll angle of the vehicle body relative to a reference plane, but since the gyro arrangement is mounted on the vehicle body in the FIGS. 2 and 3 embodiments (so that $\theta_{roll} = \theta_{roll\ VB}$), the tilt angle controlling apparatus is endeavoring to satisfy the same criterion.

Figure 4:
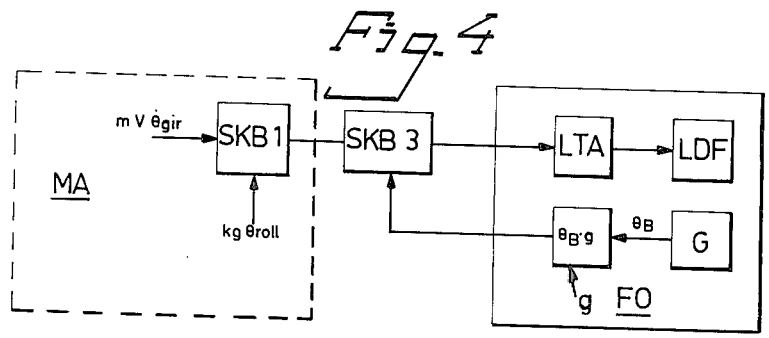
FIG. 4 is a diagrammatic block diagram illustration of an arrangement in which the gyro unit is mounted on the underframe of the vehicle instead of in the vehicle body as in other embodiments.

In many important cases it is feasible not to mount the measuring device MA mechanically firmly connected to the tilted part LDF of the vehicle, but instead to mount it on other part of the vehicle, in particular in firm connection with an underframe of the vehicle, preferably close to a wheel pair at a forward end region on a front underframe in the direction of movement of the vehicle, in which case $\theta$ roll is not equal to $\theta$ roll vB. FIG. 4 is a diagrammatic illustration of such a device and specifically of roll angle control apparatus installed in a vehicle according to the invention. In this embodiment the measuring device MA which is thus secured to an underframe of a vehicle will then, by means of output signal of the differential arrangement SKB1 present an indication representative of the residual acceleration remaining after a part-compensation of the centrifugal force caused by banking of the track usually present in curves, that is, the so called superelevation of rail. In this case, a sensing means G provides a signal representative of the angle, $\theta_B$, between the tilted part LDF of the vehicle and the underframe. The signal thus produced by the sensing means G is then in a multiplier $\theta_B.g$ multiplied with the gravity acceleration g to obtain a signal representative of the value of the expression $\theta_B.g$, which signal is applied to an input of a further differential arrangement SKB3 having a second input connected to the output of the differential arrangement SKB1 of the measuring device MA and delivering, as differential output signal, a control signal having the value $|mV\dot{\theta}_{gir}| - |kg\theta_{roll}vB|$ and appropriate sign to the tilting arrangement LTA of the vehicle. When this signal due to the action of the tilting device becomes zero, the tilted part of the vehicle has been tilted the desired angle $\theta_B$ relative to the underframe and thus the desired angle $\theta_{roll\ vB}$ relative to a horizontal plane.

I claim:

1. Apparatus for controlling the tilt angle of a vehicle body in a roll direction relative to an underframe supporting the vehicle body, comprising
    a speed detector arranged to sense the linear velocity (V) of the vehicle,
    a gyro arrangement mounted on a part of the vehicle and arranged to sense the yaw angular velocity ($\dot{\theta}_{gir}$) and the roll angular velocity ($\dot{\theta}_{roll}$) at said vehicle part, and
    means responsive to the sensed V, $\dot{\theta}_{gir}$ and $\dot{\theta}_{roll}$ to adjust the tilt angle of the vehicle body so as to tend to reduce the value of $|m.V.\dot{\theta}_{gir}| - |k.g.\theta_{roll\ VB}|$, where $\theta_{roll\ VB}$ is the roll angle of the vehicle body relative to an external reference plane, g is the acceleration due to gravity and m and k are coefficients.

2. Apparatus according to claim 1, wherein the gyro arrangement is mounted on the vehicle body and including integrating means to derive $\theta_{roll\ VB}$ from the sensed $\dot{\theta}_{roll}$.

3. Apparatus according to claim 1, wherein the gyro arrangement is mounted on the underframe and the tilt angle adjusting means includes means arranged to sense the angle of tilt ($\theta_B$) between the vehicle body and the underframe, and including integrating means arranged to derive $\theta_{roll}$ from the sensed $\dot{\theta}_{roll}$, where $\theta_{roll}$ is the roll angle of the underframe relative to said reference plane, the tilt angle adjusting means being arranged to tend to reduce the value $|m.V.\dot{\theta}_{gir}| - |k.g.\theta_{roll\ VB}|$ in dependence upon the derived $\theta_{roll}$ and the sensed $\theta_B$.

4. Apparatus according to claim 1, 2 or 3, wherein the tilt angle adjusting means including
    means to compute a first signal of value $m.V.\dot{\theta}_{gir}$, from the sensed V and $\dot{\theta}_{gir}$,
    means to compute a second signal of value $kg\theta_{roll}$ from the sensed $\theta_{roll}$,
    means for producing a signal, the magnitude of which is representative of the absolute value of the expression said difference being a signal designated $|m.V.\dot{\theta}_{gir}| - |k.g.\theta_{roll}|$,
    means for sensing the sign, plus or minus, of the roll angle $\theta_{roll}$, and
    means for applying said signal representative of the expression $|mV\theta_{roll}| - |kg\theta_{roll}|$ as a control signal to said position adjusting means with a sign, plus or minus, determined by said roll direction sensing means, said control signal in magnitude and direction being representative of a lateral acceleration signal required to control the tilting arrangement for compensation of lateral acceleration in a selected degree.

5. A device according to claim 1 in which said gyro arrangement is mounted on the body of the vehicle, means for applying the magnitude of which is representative for the expression $|m.V.\dot{\theta}_{gir}| - |k.g.\theta_{roll}|$ as such to said position adjusting means as a control signal.

6. A device according to claim 1, further comprising means to applying a signal $\dot{\theta}$ roll representative of the roll angle velocity to said position adjusting means as a velocity feedback signal.

7. A device for controlling a tilting arrangement of a vehicle, said vehicle comprising:
    parts which are mutually adjustable in a roll direction relative to each other and comprise an underframe and a body carried by said underframe,
    position adjusting means for adjusting the position of said body in the roll direction in relation to said underframe in dependence upon a control signal for compensating in a predetermined degree a lateral acceleration force exerted on objects resting on the body when the vehicle moves along a curved path, said position adjusting means being arranged to set the body in the roll direction determined by the sign, plus or minus, of said control signal applied thereto toward a position in relation to the underframe for which said control signal is reduced to a magnitude at which said predetermined degree of compensation of the lateral acceleration forces is obtained, measuring means including a speedometer to produce a signal having a value representative of the linear velocity of the vehicle, a gyro arrangement to produce a signal representative of the value of the yaw angle velocity of the vehicle, a signal having a value representative of the roll angle velocity and a signal representative of the roll angle of one of said parts of the vehicle in relation to a predetermined position when the vehicle is moving in a rectilinear path, calculating means connected to said measuring means for producing a signal having a value representative of the expression $m.V.\dot{\theta}_{gir}$, in which m is a coefficient normally having the value 1 and representing a selected degree of compensation, V is the linear velocity of the vehicle, and $\dot{\theta}_{gir}$ is the yaw angle velocity of the vehicle, and a signal having a value representative of the expression $k.g.\theta_{roll}$, in which k is a coefficient normally having a value 1 and representing a second degree of compensation, g is the gravity acceleration and $\theta_{roll}$ is the roll angle of the body, constituting the sum of superelevation angle of a path followed by the vehicle in a curve and the roll angle of the body in relation to the underframe, said device further comprising:

means for producing a signal, the magnitude of which is representative of the absolute value of the expression $m.V.\dot{\theta}_{gir}$ and the absolute value of the expression $|k.g.\theta_{roll}|$, said difference below designated $|m.V.\dot{\theta}_{gir}| - k.g.\theta_{roll}$, means for sensing the sign, plus or minus, of the roll angle $\theta_{roll}$, and means for applying said signal representative of the expression $|m.V.\dot{\theta}_{roll}| - |k.g.\theta_{roll}|$ as contrl signal to said position adjusting means with a sign, plus or minus, determined by said roll direction sensing means, said control signal in magnitude and direction being representative of a lateral acceleration signal required to control the tilting arrangement for compensation of lateral acceleration in a selected degree.

8. A device according to claim 7 in which said gyro arrangement is carried by said underframe, the device further including means for producing a signal proportional to the angle of tilting between said underframe and said body, and differential means for producing an output signal representative of a difference between said signal representing the tilting angle between said underframe and said body and the signal representative of the value of the expression $|m.V.\dot{\theta}_{gir}| - |k.g.\theta_{roll}|$, said output signal being representative of the residual acceleration to be compensated for by the tilting arrangement and being applied to said position adjusting means with a sign as determined by said roll direction sensing means.

9. A device according to claim 8, said gyro arrangement being located close to first wheel pairs in the travelling direction of the vehicle.

10. A device according to claim 7 in which the gyro arrangement is placed on said body of the vehicle.

* * * * *